United States Patent
McCreary

[15] 3,637,111
[45] Jan. 25, 1972

[54] HEATING SYSTEM
[72] Inventor: Mabry L. McCreary, St. Louis, Mo.
[73] Assignee: Inmont Corporation
[22] Filed: Aug. 29, 1967
[21] Appl. No.: 664,131

[52] U.S. Cl. ...................................222/146 H, 222/261
[51] Int. Cl. ..............................................B67d 5/62
[58] Field of Search.....................222/146 H, 259, 333, 261

[56] References Cited

UNITED STATES PATENTS

| | | | |
|---|---|---|---|
| 2,522,652 | 9/1950 | Von Hasse | 222/146 UX |
| 2,630,248 | 3/1953 | Hinz | 222/259 X |
| 3,031,106 | 4/1962 | Hooker | 222/146 H |
| 3,113,705 | 12/1963 | Weitzel | 222/262 X |
| 3,412,903 | 11/1968 | Van Riper et al. | 222/146 |

FOREIGN PATENTS OR APPLICATIONS 4,542   4/1900   Great Britain.........................248/154

Primary Examiner—Samuel F. Coleman
Assistant Examiner—Frederick R. Handren
Attorney—F. W. Wyman and Julius B. Kraft

[57] ABSTRACT

This invention relates to apparatus for substantially simultaneously heating and pumping out thermoplastic or other meltable materials from shipping drums or similar receptacles. The apparatus broadly comprises a movable head carrying a heating coil on the underside thereof. The head is formed so as to fit snugly in the interior of the receptacle to be emptied. The heating coil is attached to but spaced from the underside of the head. Means are provided to advance the head into the receptacle and to pump the melted material therefrom.

2 Claims, 1 Drawing Figure

PATENTED JAN 25 1972
3,637,111
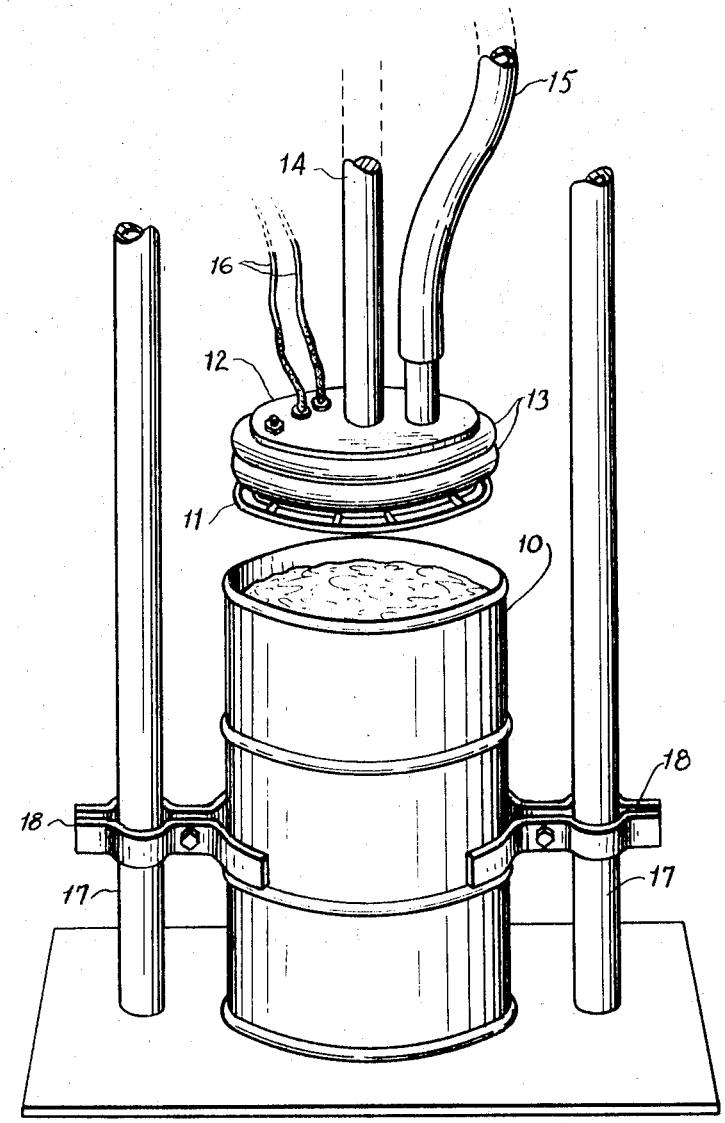

HEATING SYSTEM

Formerly containers of such materials, particularly the large ones, for instance 55-gallon drums, were heated by external heating devices, and even by conveying them into a hot room. The molten material was then removed from the containers by various means. It has even been necessary in some applications to have the thermoplastic material formed into various shapes and sizes by the manufacturer before shipping. These formed pieces are required to speed up the fusing and handling of the thermoplastic material by some customers. Some of these systems require 16 to 24 hours for thorough heating, particularly with large containers, say 55-gallon drums as an example.

The process and apparatus of this invention are speedier than that. For instance a 55-gallon drum can be emptied of thermoplastic material in about 20 minutes by heating and pumping according to this invention. This corresponds to a removal rate of about 2 to 3 gallons per minute. The heating and pumping time will depend upon the thermoconductivity of the substances and the maximum temperature permitted for the substances. The heating element can be constructed of such size, spacing, and heat input as to be suitable for the particular material in the container.

The process is carried out by means of a heating head, which is a pistonlike disk in general form, disposed in a position substantially parallel to the floor and having a piston rod or other means attached thereto for driving the heating head towards the bottom of the drum, or other receptacle, which is open at the top and usually is resting upright on the floor with or without clamping means for positioning the receptacle and preventing undesired movement.

A pipe or other outlet that may be heated is fixed in the heating head for pumping the melted resin out of the container. A heating grid or coil is fixed on the advancing side of the heating head and is approximately the same size and shape as the head with respect to peripheries. The heater is spaced a few inches away from the advancing side of the pistonlike supporting head.

As the plastic, or other material, flows through the interstices of the heater and into the space between heater and supporting head, it is gradually melted. It is drawn up then through the discharge hose or similar pump orifice as the downwardly moving supporting head and heater maintain the flow of plastic through the heater. The process can be continued until the heater reaches the bottom of the container. The discharge hose or similar device should be heated sufficiently to maintain the outflowing plastic material in an adequately flowable state.

One embodiment of the working of this invention is illustrated in the FIGURE, where 10 is a conventional 55-gallon drum containing a thermoplastic resinuous material, 11 is a heater in the form of an electrical heating coil spaced a few inches away from 12, a disklike or pistonlike supporting head. This head has two gaskets 13,13, such as rubber tires, in order to make a reasonably snug fit inside the drum. Also, 14 is a piston rod type of support for the heating head and is connected to means adapted to push the head down into the drum with enough force to carry out the process and lift the head up again. Also, 15 is a heated discharge pipe, connected to a conventional drum pump, for withdrawing molten plastic from the region above the heating coil. Furthermore, 16,16 are electrical leads to the heating coil. Also, 17,17 are pillarlike supports for the pump and the piston rod and may be parts of a conventional drum pump. Furthermore, 18,18 are adjustable clamps for holding the drum in position and for facilitating the correct positioning of it.

The use of gaskets and the resultant reasonably close fit of the heating head to the inside circumference of the drum make possible the emptying of the drum with minimal contact with air. The melted plastic removed from the drum may be conducted by hose, pipe, or other suitable conveyor to the point where it is to be utilized, for example to a mixer, extruder, or the like.

The heater, besides being composed of an electrical heating coil, may alternatively be tubing through which flows steam, hot liquid, or hot gases. Heat transfer is augmented by use of a spirally coiled ribbon of conducting material for electrical heating, or ribbonlike tubing for the flow of hot fluids. Close spacing in the heater also improves heat transfer. The ribbons may be, for instance 1 to 1½ inches in width and the spacing may advantageously be ¼ to ⅜ inch between turns.

The gasket on the heating head should be resilient enough to compensate for such irregularities in the receptacles as may commonly be expected, such as dents in the sides and small departures from the form of a right-circular cylinder.

The pump can be any suitable conventional pump such as a standard Pyles drum pump. It is usually necessary to heat the conveyor and discharge pipes or hose to prevent the molten material from again solidifying before desired.

The drum can be brought into position without excessive lifting, tipping, or the like.

What is claimed is:

1. For use in combination with a container of high-viscosity material, apparatus for dispensing said material from said container comprising:

a stationary assembly, a movable assembly carried by said stationary assembly, said movable assembly including a follower member adapted to enter the container through the top thereof, wiper means disposed about the periphery of said follower member and adapted to engage the interior surface of the container, a vertical aperture through said follower member, said follower member being solid and impervious to said high-viscosity material from said aperture transversely outwardly to said periphery so that said follower member is operable as a piston when moved into said container, a heating platen carried by and below said follower member, said heating platen being spaced below the bottom surface of said follower member so as to define a reservoir between the top surface of said heating platen and the bottom surface of said follower member, said heating platen having a total area in horizontal cross section less than the total horizontal cross-sectional area of said container such that said material can pass upwardly into said reservoir after having been heated, a pump having an inlet tube extending downwardly through said vertical aperture of said follower member, the inlet of said inlet tube being located within said reservoir and above the top surface of said heating platen such that only material which has passed upwardly above said heating platen and into said reservoir may enter said pump inlet tube to be pumped from said container, said pump inlet tube having approximately the same transverse cross-sectional area as said vertical aperture of said follower member at the point where said tube passes through said aperture, said heating platen having a total horizontal cross-sectional area less than the total combined horizontal cross-sectional area of said follower member and said pump inlet so that said material may be forced into said pump inlet by downward force of said movable assembly, and means to move said movable assembly downwardly into the container.

2. The dispensing apparatus of claim 1 in which said heating platen has a plurality of small vertical apertures therein through which said heated material may pass upwardly into said reservoir.

\* \* \* \* \*